US007579719B2

(12) United States Patent
Heberlein

(10) Patent No.: US 7,579,719 B2
(45) Date of Patent: Aug. 25, 2009

(54) PROTECTOR SUITABLE FOR CASCADE CONNECTIONS AND CORRESPONDING METHOD FOR SAFETY-CONDITIONED SWITCHING

(75) Inventor: Thomas Heberlein, Feucht (DE)

(73) Assignee: Siemens Aktiengesellschaft, Munich (DE)

( * ) Notice: Subject to any disclaimer, the term of this patent is extended or adjusted under 35 U.S.C. 154(b) by 443 days.

(21) Appl. No.: 10/567,563

(22) PCT Filed: Jul. 14, 2004

(86) PCT No.: PCT/EP2004/007797

§ 371 (c)(1),
(2), (4) Date: Feb. 8, 2006

(87) PCT Pub. No.: WO2005/017932

PCT Pub. Date: Feb. 24, 2005

(65) Prior Publication Data

US 2006/0232899 A1 Oct. 19, 2006

(30) Foreign Application Priority Data

Aug. 8, 2003 (DE) ................................ 103 36 574

(51) Int. Cl.
*H02H 11/00* (2006.01)

(52) U.S. Cl. ............................ 307/326; 361/67; 700/79

(58) Field of Classification Search ................. 340/644; 307/326, 328; 361/62; 700/79
See application file for complete search history.

(56) References Cited

U.S. PATENT DOCUMENTS

| | | | | |
|---|---|---|---|---|
| 6,037,857 | A | 3/2000 | Behrens et al. | |
| 6,825,579 | B2 * | 11/2004 | Ehrlich et al. | 307/113 |
| 2002/0130557 | A1 | 9/2002 | Dickhoff | |
| 2002/0175568 | A1 * | 11/2002 | Clement et al. | 307/326 |
| 2002/0195883 | A1 * | 12/2002 | Lazzaro | 307/326 |
| 2003/0011250 | A1 * | 1/2003 | Pullmann et al. | 307/326 |

FOREIGN PATENT DOCUMENTS

| | | | |
|---|---|---|---|
| DE | 197 15 098 | A | 10/1998 |
| DE | 197 50 958 | C2 | 11/1998 |
| DE | 100 11 211 | A | 9/2001 |
| DE | 100 45 651 | A1 | 4/2002 |

* cited by examiner

*Primary Examiner*—Albert W Paladini
*Assistant Examiner*—Daniel Cavallari
(74) *Attorney, Agent, or Firm*—Harness, Dickey & Pierce, P.L.C.

(57) ABSTRACT

An installation is disclosed which can be switched on again by way of a common switch-on key. A pulse processing device integrated into the respective emergency off device is required for putting the emergency-off device for predetermined period of time after the switch-on pulse of the switch-on pulse of the switch-on key into an activation mode in which it can be switched on when no switch-off signal is available. It is thus possible to take the reaction times of the individual devices or actuators required for the cascading of emergency-off devices for switching on into consideration for a common switch-on operation.

19 Claims, 4 Drawing Sheets

RELATED ART

RELATED ART

PROTECTOR SUITABLE FOR CASCADE CONNECTIONS AND CORRESPONDING METHOD FOR SAFETY-CONDITIONED SWITCHING

This application is the national phase under 35 U.S.C. § 371 of PCT International Application No. PCT/EP2004/007797 which has an International filing date of Jul. 14, 2004, which designated the United States of America and which claims priority on German Patent Application number 103 36 574.5 filed Aug. 8, 2003, the entire contents of which are hereby incorporated herein by reference.

FIELD

The present invention generally relates to a protective device for safety-related switching of an electrical unit. For example, the device may include a first input for the purpose of receiving a switch-off signal, a second input for the purpose of receiving a switch-on signal in the form of a switch-on pulse, and an output for the purpose of driving the electrical unit. Furthermore, the present invention generally relates to a corresponding method for safety-related switching of an electrical unit.

BACKGROUND

In safety-related systems and devices, an emergency-stop pushbutton can be provided for the purpose of switching the system or device. Shutdown takes place by way of a safety device or protective device.

FIG. 1 illustrates such a system in the form of a block diagram. The protective device 1, which may also be referred to as an emergency-stop device, has a multichannel input, via which it receives an emergency-stop signal from an emergency-stop pushbutton 2. Furthermore, the protective device 1 has a second input, via which a switch-on signal from an on pushbutton 3 can be received. This on pushbutton 3 is in the form of a normally open pushbutton.

The protective device 1 drives an actuator 4, for example a contactor. The actuator 4 for its part switches a load contact 5 and, at the same time, a monitoring contact 6. In the non-active state of the actuator 4, the load contact 5 is open and the monitoring contact 6 is closed.

In accordance with the European safety standard EN 954, for category 4, an automatic restart should not take place after an emergency stop on a safety device once the cause of the emergency stop has been eliminated. Thus, once an emergency-stop pushbutton has been pressed, it is first latched again for reconnection purposes. In this case, the device does not yet start. It is only when an on pushbutton is actuated that the output(s) is/are released and the device starts up.

In addition, for category 4 of this safety standard EN 954, monitoring of the actuators needs to be provided, i.e. monitoring contacts 6 of the emergency-stop device 1 or the connected actuator 4 need to be introduced into the on-pushbutton circuit. As a result, faults on the actuator 4 can be recognized. If, for example, the load contact 5 of a contactor is welded owing to an overload, the monitoring contact 6 is open even if the contactor is not activated. This means that the on-pushbutton circuit is interrupted and a reconnection is prevented.

For category 4 of the safety standard EN 954, it is also prescribed that evaluation of the on-pushbutton circuit needs to be edge-sensitive. In particular, the falling edge or both edges of a switch-on pulse need to be detected. As a result, undesired restarting of an electrical device, for example, owing to a cross-connection at the inputs or outputs of the emergency-stop device 1 can be prevented.

In the case of relatively large systems, for example a conveyer belt, two or more emergency-stop pushbuttons can be provided. In this case, the associated protective devices are connected in cascade fashion, as illustrated in FIG. 2. The fundamental design of each circuit group corresponds to that in FIG. 1.

For reasons of clarity, only two stages of a cascade are illustrated in FIG. 2, each stage having a protective device or emergency-stop device or an emergency-stop pushbutton. The first emergency-stop device 11 is connected to a two-channel emergency-stop pushbutton 12, 12'. This in turn likewise drives two actuators or contact multipliers 14 and 14' so as to adhere to category 4 of the safety standard EN 954. The actuators 14 and 14' actuate monitoring contacts 16 and 16', which are connected in series and form, with an on pushbutton 13, an on-pushbutton circuit, for example from an external supply voltage source (24 V) to the emergency-stop device 11.

In addition, in each case two twin load contacts 15 and 15' are actuated with the aid of the actuators 14 and 14'. These twin load contacts 15 and 15' form, together with a two-channel emergency-stop pushbutton 22, 22', an emergency-stop circuit at the second emergency-stop device 21. This likewise drives two actuators or contact multipliers 24 and 24' which, for their part, actuate monitoring contacts 26 and 26' and twin load contacts 25 and 25'. The monitoring contacts 26 and 26' form, with an on pushbutton 23, the on-pushbutton circuit of the emergency-stop device 21. The cascading can be continued correspondingly as desired at the twin load contacts 25 and 25'.

The way in which this cascade circuit functions will be described below. If the emergency-stop pushbutton 12, 12' is actuated at the first emergency-stop device 11, the actuators 14, 14' of the emergency-stop device 11 are de-energized. The load contacts 15, 15' of these actuators 14, 14', which are incorporated in the emergency-stop circuit of the emergency-stop device 21, are thus also opened. As is already the case in the emergency-stop circuit of the emergency-stop device 11, this leads to an interruption in the emergency-stop circuit of the emergency-stop device 21. The actuators 24 and 24' of the emergency-stop device 21 are therefore also switched off. As a result, all of the load circuits in the cascade are switched off.

If only the emergency-stop pushbutton 22, 22' is actuated, only the actuators 24, 24' of the emergency-stop device 21 are de-energized. The load monitoring contacts 26, 26' and the twin load contacts 25, 25' are therefore also de-energized. As a result, all of the downstream load circuits in the cascade are switched off. The actuators 14, 14' of the emergency-stop device 11 remain active.

In order to switch the load circuits on again, the emergency-stop pushbutton 12, 12' of the emergency-stop device 11 is latched again, i.e. the emergency-stop circuit is in a closed state. At this point in time, the load circuits are not yet complete, however. For this, the on pushbuttons 13 and 23 also need to be actuated.

If the on pushbutton 23 at the emergency-stop device 21 is actuated first, the emergency-stop device 21 does not switch its actuators 24, 24' on since the actuators 14, 14' of the emergency-stop device 11 still interrupt the emergency-stop circuit of the emergency-stop device 21. In order to switch the load circuits on again, initially the on pushbutton 13 of the emergency-stop device 11 therefore needs to be actuated. Thereupon, the actuators 14, 14' of the emergency-stop device 11 are driven and the emergency-stop circuit of the emergency-stop device 21 is closed. Only now can the emergency-stop device 21 be started by actuating its on pushbutton 23. Thus, a prescribed sequence needs to be maintained for actuating the on pushbutton. However, such an inconvenient operating method for systems is unsuitable in industry.

A similar safety switching device system has been disclosed in document DE 100 11 211 A1. This safety switching device system includes two safety switching devices which correspond to one another in terms of their design and their operation. The two devices are connected one behind the other with an emergency-stop switch connected in between. In addition, a starting switch is provided on both devices.

SUMMARY

An object of at least one embodiment of the present invention resides in proposing a protective device or protective system and a corresponding method for safety-related shutdown of an electrical unit, which device or system and/or method make operation of more complex systems more convenient.

An object may be achieved according to at least one embodiment of the invention by a protective device for the safety-related shutdown of an electrical unit having a first input for the purpose of receiving a switch-off signal, a second input for the purpose of receiving a switch-on signal in the form of a switch-on pulse, and an output for the purpose of driving the electrical unit and by a pulse processing device for the purpose of setting the protective device to an activation state, in which it can be switched on when the switch-off signal is not applied, for a predetermined period of time from reception of the switch-on pulse.

In addition, at least one embodiment of the invention provides a method for safety-related switching of an electrical unit by means of receiving a switch-off signal, switching the electrical unit off, receiving a switch-on signal in the form of a switch-on pulse, and switching the electrical unit on, it being possible to switch the electrical unit on only for a predeterminable period of time after reception of the switch-on pulse.

The switch-on signal, for example, may originate from an on pushbutton. The protective device thus receives a single switch-on pulse which generally has the binary form L-H-L.

The switch-off signal generally originates from a latchable emergency-stop pushbutton. The emergency-stop pushbutton can thus not be closed unintentionally, which is of great importance in terms of safety.

The electrical unit, which is switched by the protective device, may be an actuator and, in particular, a contactor. As a result, load circuits having relatively high currents can also be switched easily.

The inputs and outputs of the protective device should have a plurality of channels. This is prescribed for category 4 of the safety standard EN 954 and increases the standard of safety.

The falling edge or both edges of the switch-on pulse can advantageously be evaluated by the pulse processing device for the purpose of setting the protective device to the activation state. This edge sensitivity is likewise prescribed by the safety standard mentioned in order that no unintentional restarting of the emergency-stop device or protective device takes place as a result of cross-connection.

In order to implement the temporally limited activation state, the pulse processing device can have a timing element which provides an acknowledgment command for the purpose of maintaining the activation state for a predetermined time after the switch-on pulse. The protective device can thus be switched on for a certain period of time after the switch-on pulse, as desired. According to at least one embodiment of the invention, response times of the individual devices with respect to one another can thus be taken into account.

In this case, the period of time for the activation state may be, for example, set such that it corresponds to the activation time of at least one electrical unit and/or at least one further switching device.

Protective devices according to at least one embodiment of the invention are particularly advantageously connected to form a protective system in the form of a cascade. In this case, the first input of a second of the plurality of protective devices is driven by the output of one of the plurality of protective devices. This also applies, in the same manner, to the other cascade stages.

The abovementioned period of time for the activation state is dimensioned for this purpose such that it is greater than the total of the response times of all of the protective devices. This protective system can be switched on by a common on pushbutton when the inputs of the plurality of protective devices are correspondingly connected. The units or systems connected by the protective devices can thus be switched on again in a convenient manner after an emergency-stop actuation.

BRIEF DESCRIPTION OF THE DRAWINGS

Example embodiments of the present invention will be explained in more detail with reference to the detailed description and the attached drawings, in which.

The example embodiments described below represent example embodiments of the present invention.

DETAILED DESCRIPTION OF THE EXAMPLE EMBODIMENTS

The intended use of the following example embodiment is, as has been mentioned, for example, a conveyer belt, on which a plurality of emergency-stop pushbuttons are mounted. However, the conveyer belt should only be switched on after an emergency-stop actuation by an authorized person. For this purpose, for example a central on pushbutton is located at a control station, for example, a control cabinet.

Figure 1:
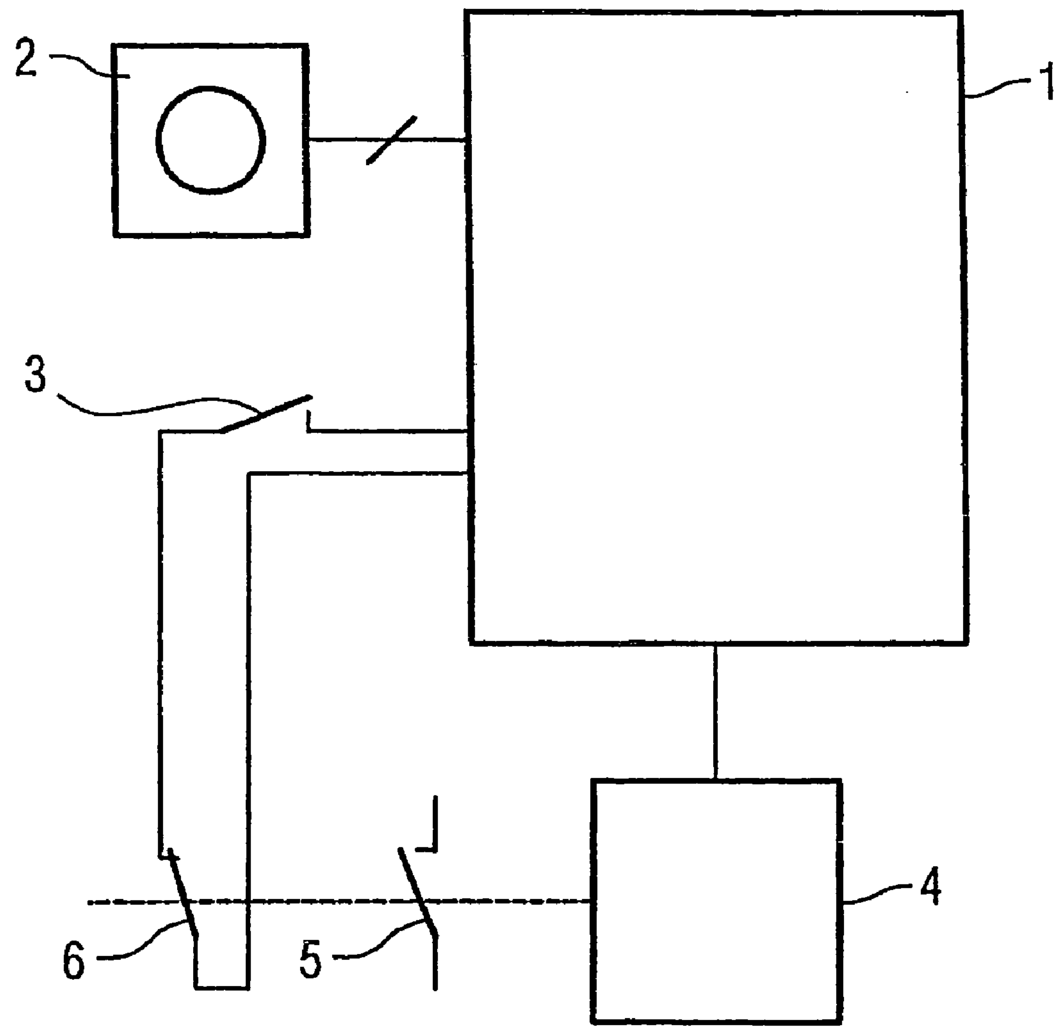
FIG. 1 shows a block diagram of a safety combination according to the prior art.
Figure 2:
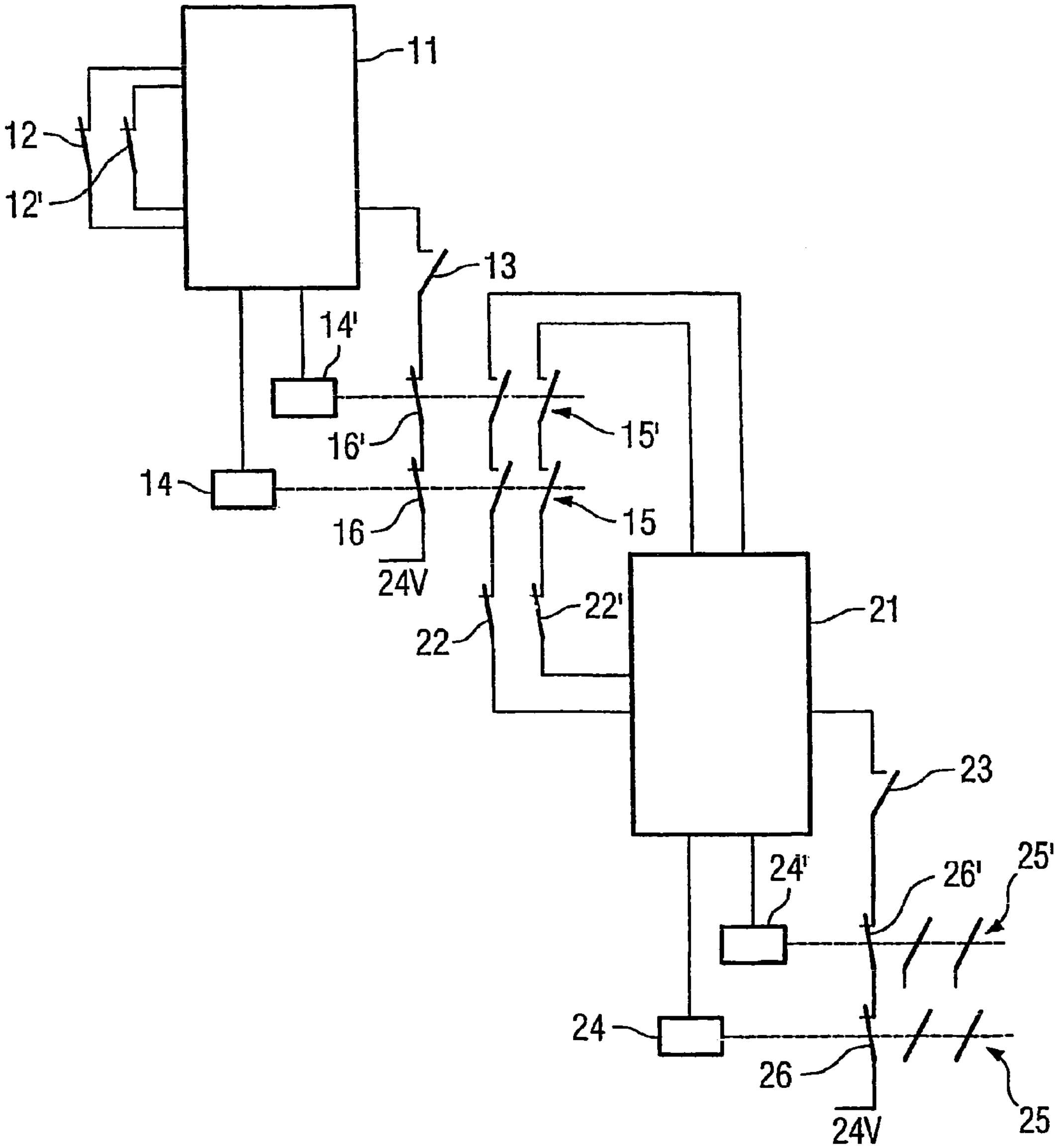
FIG. 2 shows a block diagram of a plurality of cascaded safety combinations corresponding to the prior art.
Figure 3:
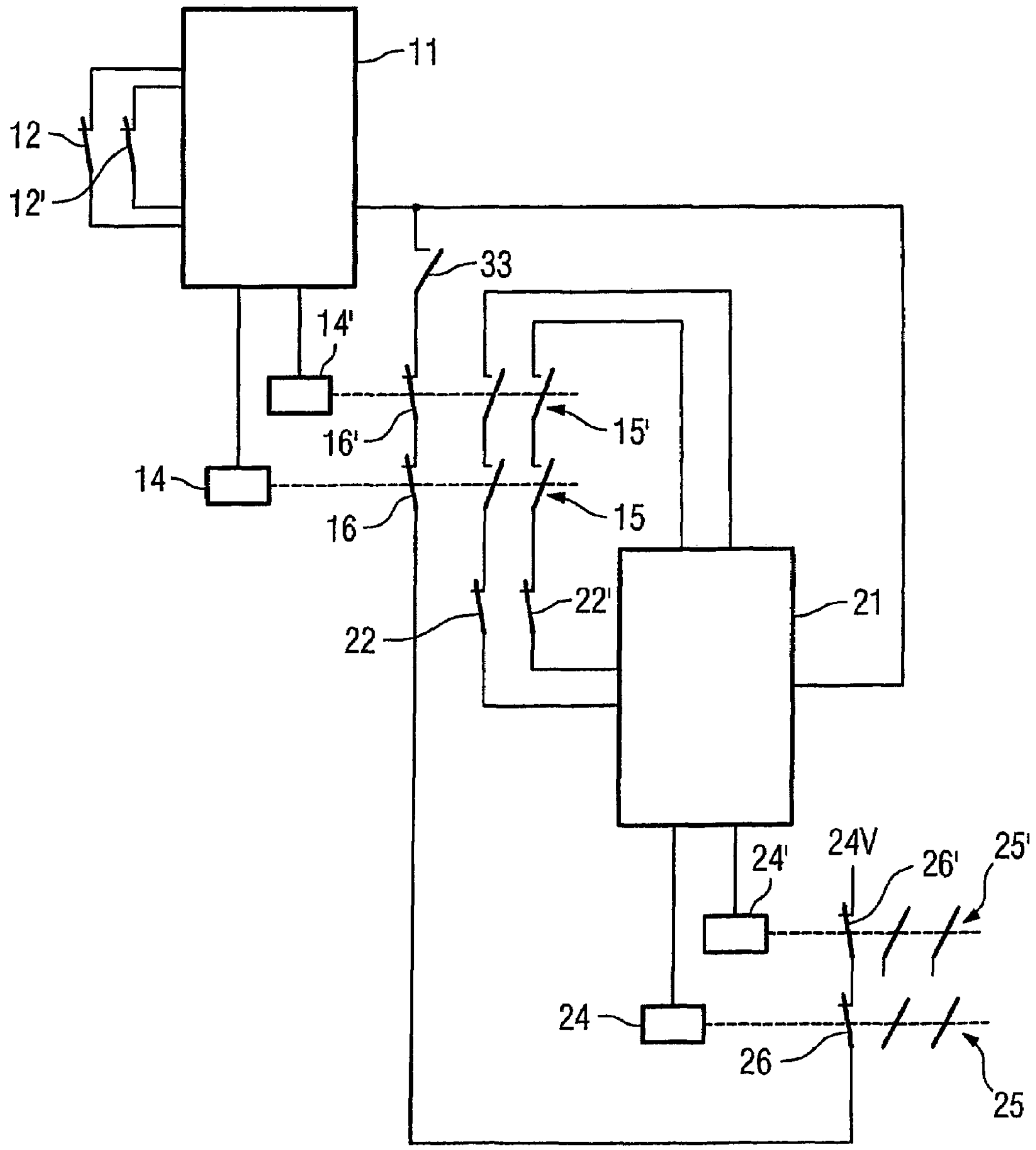
FIG. 3 shows a block diagram of cascaded safety combinations in accordance with at least one embodiment of the present invention.

FIG. 3 illustrates, in the form of a block diagram, a safety system suitable for this purpose having a plurality of emergency-stop devices in a cascade circuit having a common on pushbutton. The design is essentially the same as that in FIG. 2, with the result that reference is made to the description relating to FIG. 2 with respect to the same elements. One difference from the embodiment in FIG. 2 is the fact that, in the exemplary embodiment in FIG. 3, only a single on pushbutton 33 is used which provides an on pulse for all of the protective devices or emergency-stop devices. Both the monitoring contacts 16 and 16' and the monitoring contacts 26 and 26' are thus in the on-pushbutton circuit.

If the emergency-stop devices 11 and 21 have a known design, it is not possible to implement the system according to category 4 (monitored start/restart). The reason for this is the fact that the on-pushbutton pulse arrives at the downstream device 21 before release (unlatching) of the emergency-stop circuit 15, 22 or 15', 22' or the on-pushbutton circuit 26', 26, 16, 16', 33 is interrupted. If the emergency-stop pushbutton 12, 12' is latched again, i.e. closed, for the purpose of connecting the system and the common on pushbutton 33 is actuated (L-H-L pulse), although the first emergency-stop device 11 is switched on, the second emergency-stop device 21 cannot be switched on. This is because the emergency-stop circuit is still interrupted by the second emergency-stop device 21 at the time of the on-pushbutton pulse, because the actuators of the emergency-stop device 11 only respond to the on-pushbutton pulse after a certain response time.

A very simple solution to this would reside in the plurality of emergency-stop devices being released by the common on pushbutton being pressed a plurality of times. With two emergency-stop devices in cascade, the on pushbutton would thus need to be pressed twice in order to switch the system on again. If the emergency-stop accessories become more complex, however, small controllers can also be used which produce corresponding release pulses for the emergency-stop devices. However, this is associated with very high costs and is sometimes even impermissible, in particular in safety technology.

Provision is now made according to at least one embodiment of the invention, by modifying the device-internal evaluation of the on-pushbutton pulse, for the two emergency-stop devices 11 and 21 to be switched on simultaneously with a single release command by the on pushbutton 33 and, in the process, for the required safety conditions for the emergency-stop circuits to be maintained.

Figure 4:
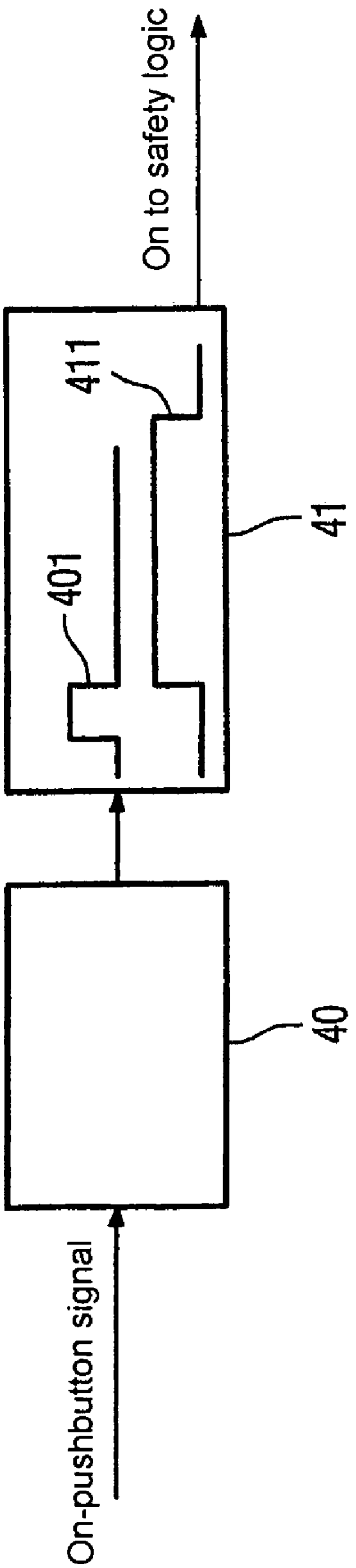
FIG. 4 shows a block diagram of the on-pushbutton pulse evaluation according to at least one embodiment of the invention.

FIG. 4 shows a block diagram illustrating the on pushbutton evaluation according to the invention. Accordingly, an on-pushbutton signal undergoes edge evaluation 40. In this case, the falling edge or both edges of the switch-on pulse are evaluated in accordance with the required safety standard. A corresponding binary signal 401 is made available to a pulse processing device 41. The pulse processing device 41 extends the switch-on pulse to a predetermined acknowledgment time by a timing element being started. This results in an internal acknowledgment command 411 for the further safety logic which is provided for a specific time, for example 500 ms. This evaluation of the on-pushbutton pulse is carried out continuously, even if there is no emergency stop at that time. If the emergency-stop circuit is then closed within this acknowledgment time, the output is driven via the safety logic, and the device to be switched is switched on again.

This pulse processing according to at least one embodiment of the invention results in the following operational sequence for the circuit in FIG. 3: the two emergency-stop pushbuttons 12, 12' and 22, 22' are already closed again. This is done in order to switch the device or the system on again. The on pushbutton 33 is actuated, as a result of which the L-H-L pulse 401 known from FIG. 4 is generated. The emergency-stop device 11 switches on. At the same time, the acknowledgment time is also started in the emergency-stop device 21.

Once the emergency-stop device 11 has closed both actuators 14, 14' after a specific response time, the emergency-stop device 21 recognizes a closed emergency-stop circuit 22, 22', 15, 15' and likewise switches its actuators 24, 24' on. This is done on the basis of the acknowledgment command which is still present. If the emergency-stop device 11 does not switch its actuators 14, 14' on owing to a fault, the emergency-stop device 21 also does not switch its actuators 24, 24' on since in this case the emergency-stop circuit 22, 22', 15, 15' of the second emergency-stop device 21 is open. The internal acknowledgment command in the two emergency-stop devices 11 and 21 is then cancelled once the acknowledgment time has expired.

The acknowledgment time is to be selected such that, at a desired cascading depth, the internal acknowledgment command is even after the individual response or activation times of the actuators and emergency-stop devices. This is particularly easy to realize in the case of electrical emergency-stop devices since their response times are short and thus the acknowledgment time may be short. If, on the other hand, the acknowledgment time is predetermined in the emergency-stop devices, only a certain cascading depth can be achieved depending on the response times of the individual devices. However, it is necessary to avoid cascading depths which are too great since the response time in the event of shutdown via the emergency-stop pushbutton brings about a considerable delay owing to the cascading.

One further advantage results from the fact that all of the monitoring contacts 16, 16', 26, 26' are connected in series. If there is a fault in the downstream emergency-stop device 21 or its actuator 24, 24', the upstream emergency-stop device 11 cannot be switched on again either.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A protective device for the safety-related shutdown of an electrical unit, comprising:

a first input for receiving a switch-off signal;

a second input for receiving a switch-on signal in the form of a switch-on pulse;

an output for driving the electrical unit; and a pulse processing device for setting the protective device to an activation state, in which it is switchable on when the switch-off signal is not applied, for a predetermined period of time from reception of the switch-on pulse, wherein the pulse processing device includes a timing element which provides an acknowledgment command for maintaining the activation state for a predetermined time after the switch-on pulse.

2. The protective device as claimed in claim 1, wherein the switch-on signal originates from an on pushbutton.

3. The protective device as claimed in claim 1, wherein the switch-off signal originates from a latchable emergency-stop pushbutton.

4. The protective device as claimed in claim 1, wherein the electrical unit is an actuator.

5. The protective device as claimed in claim 1, wherein the inputs and outputs include a plurality of channels.

6. The protective device as claimed in claim 1, wherein at least one of the falling edge and both edges of the switch-on pulse are evaluated by the pulse processing device for setting the protective device to the activation state.

7. The protective device as claimed in claim 1, wherein the predetermined period of time for the activation state corresponds to at least one of the activation time of the electrical unit and a further protective device.

8. The protective device as claimed in claim 1, wherein the electrical unit is a contactor.

9. A protective system having a plurality of protective devices as claimed in claim 1, connected in cascade fashion, a first input of a second of the plurality of protective devices being driven by the output of a first of the plurality of protective devices.

10. The protective system as claimed in claim 9, wherein the inputs of the plurality of protective devices are connected to a common on pushbutton.

11. A method for safety-related switching of an electrical unit, the method comprising:

receiving a switch-off signal;

switching the electrical unit off;

receiving a switch-on signal in the form of a switch-on pulse;

switching the electrical unit on, the electrical unit being switchable on for a predeterminable period of time after reception of the switch-on pulse; and providing an acknowledgement command for maintaining an on state of the electrical unit for a predetermined time after the switch-on pulse is received, wherein at least one of the falling edge and both edges of the switch-on pulse are evaluated in order to start the predeterminable period of time in which the electrical unit is switchable on.

12. The method as claimed in claim 11, wherein the switch-on signal originates from an on pushbutton.

13. The method as claimed in claim 11, wherein the switch-off signal originates from a latchable emergency-stop pushbutton.

14. The method as claimed in claim 11, wherein the electrical unit is an actuator.

15. The method as claimed in claim 11, wherein the switch-on and switch-off signals are received on a plurality of channels.

16. The method as claimed in claim 11, wherein the predeterminable period of time for switching on the electrical unit corresponds to at least one of the activation time of the electrical unit and a further protective device.

17. A method for safety-related switching of a plurality of protective devices connected in cascade fashion, a second of the plurality of protective devices being connected with the aid of a first of the plurality of protective devices in accordance with the method as claimed in claim 11.

18. The method as claimed in claim 17, wherein the switch-on signal makes all of the plurality of protective devices available simultaneously.

19. The method as claimed in claim 11, wherein the electrical unit is a contactor.

* * * * *